Feb. 21, 1961 B. HACKFORTH 2,972,241
FLEXIBLE COUPLINGS FOR SHAFTS
Filed Feb. 24, 1959 2 Sheets-Sheet 1
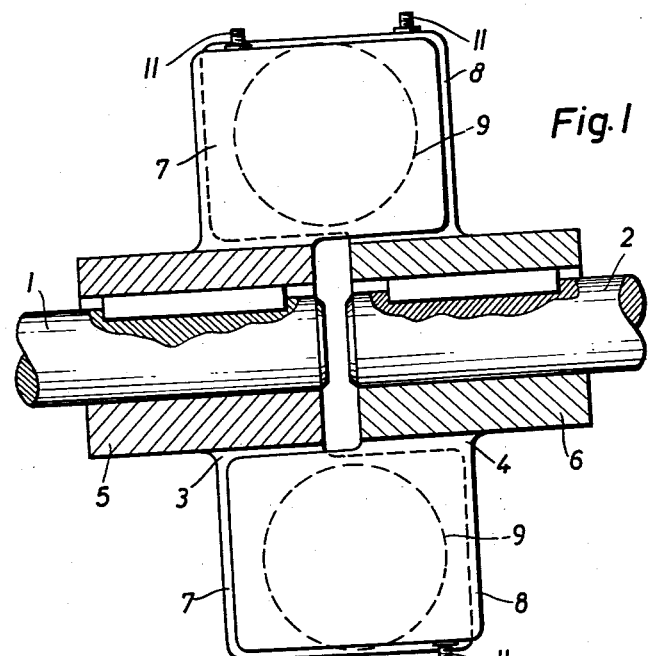
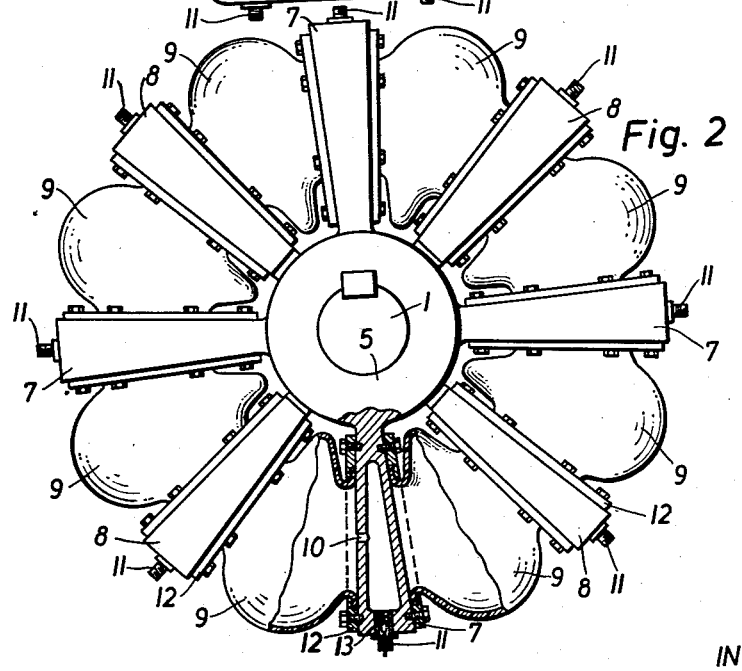
INVENTOR
BERNHARD HACKFORTH
BY
Mestern & Hollin
ATTORNEYS Feb. 21, 1961   B. HACKFORTH   2,972,241
FLEXIBLE COUPLINGS FOR SHAFTS
Filed Feb. 24, 1959   2 Sheets-Sheet 2
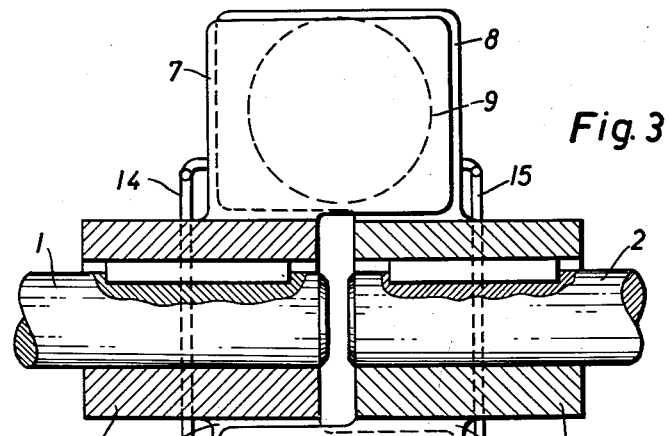
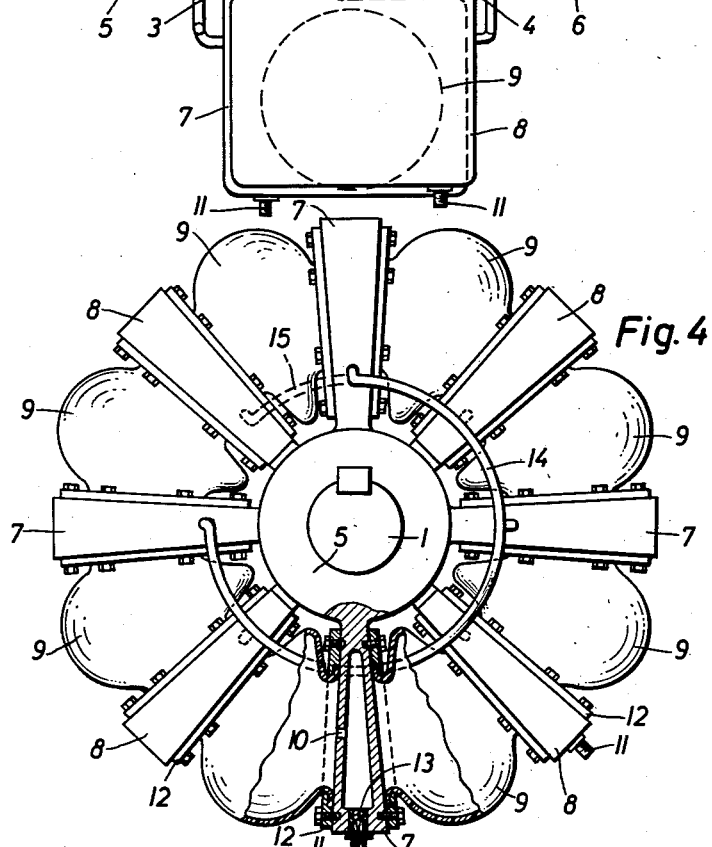
INVENTOR
BERNHARD HACKFORTH
BY
*Mestern & Kollin*
ATTORNEYS United States Patent Office 2,972,241
Patented Feb. 21, 1961

2,972,241

FLEXIBLE COUPLINGS FOR SHAFTS

Bernhard Hackforth, Heerstrasse 52–58, Wanne-Eickel, Germany

Filed Feb. 24, 1959, Ser. No. 795,002

Claims priority, application Germany Feb. 25, 1958

7 Claims. (Cl. 64—26)

Elastic couplings for shafts are known comprising coupling halves fitting one in the other by means of arms arranged in star fashion about the axis of the shaft and interconnected by coupling elements of elastic deformable material arranged between the arms. The couplings are more or less elastic according to the shape, especially the ratio between the cross-section and length of the coupling elements, the choice of the material from which they are made and their arrangement in relation to the axis of the shafts. These shaft couplings, which are of very simple construction and therefore cheap and widely used, are, however, open to certain objections. As the coupling elements with a given cross-section must not exceed a certain length because otherwise they will tend to buckle, the known couplings provided with elements of elastic deformable material are relatively hard. It is likewise only possible to change the elasticity of these couplings by changing the coupling elements. Moreover the adjustment of the interengaging coupling arms in relation to each other in the direction of the axis of the shaft and consequently an angular adjustment of the coupled shafts in relation to each other, which is dependent upon the elastic deformability of the coupling elements, is relatively small. The angular adjustment does not amount to more than an angle of 10° in the case of the known couplings. In addition translatory shifting of the coupled shafts is only possible to a slight extent.

The object of the invention is to produce couplings of the type described so that on the one hand they possess greater elasticity in the direction of rotation, that is are softer than the known couplings, and on the other hand allow the degree of elasticity to be adjusted within a wide range and at will, without the necessity of exchanging the coupling elements. The attainment of this object will enable the coupling to adapt itself within wide limits to the rotary forces to be transmitted.

Another object of the invention is to construct the coupling so that the shafts which it connects can be shifted axially in relation to each other, as well as angularly adjusted in relation to each other and also parallel-displaced a considerably greater distance than when employing ordinary couplings. This is particularly important in the case of engines which are supported on shock absorbers or spring suspended and are to be coupled with a rigidly mounted shaft.

The advantages mentioned are attained by couplings with coupling elements of elastic deformable material arranged between the arms of the coupling in that, according to the invention, the coupling elements are constructed as hollow bodies filled with gas under pressure, in particular with compressed air. Such hollow bodies constitute between each two arms of different coupling halves resilient elements which are brought out of their tensionless state at first very easily but their compression then becomes gradually more difficult. Nevertheless they are capable of taking up tractive forces provided they are firmly connected with the coupling arms. Due to the elastic yieldability of their walls, the fixed surfaces of these bodies can displace in relation to each other in all directions within wide limits without being destroyed or damaged in the process.

If the pressure of the gas imprisoned in the coupling elements is made adjustable, it is possible to adapt within wide limits the yieldability of the coupling in the drection of rotation to the actual loading conditions. The adjustment of the gas pressure can be effected by various means. Thus, for example, the coupling arms can each be composed of two parts capable of spreading in the direction of rotation and the coupling elements are fixed on the surfaces of these parts facing away from each other. A particularly simple adjustment of the gas pressure can be attained when the coupling elements are connected to a nipple containing a non-return valve and can be connected up with a compressed gas feed. Then the gas pressure in each coupling element can be adjusted to the pressure actually required, just as in the case of the tires of motor vehicles. So as to maintain the gas always under the same pressure in all the coupling elements or in a certain group thereof, for example in the elements which are subjected to pressure in the case of a rotating shaft, it is advisable to interconnect the coupling elements by means of gas passages. In this case an automatic compensation of pressure takes place within the interconnected coupling elements so that the force transmitted to the shaft is always uniformly distributed on all the coupling arms.

To increase the flexibility or elasticity of the coupling without it being necessary to give the coupling elements undesirably large dimensions, it is advisable to connect these coupling elements singly, in groups or all together with an auxiliary gas chamber. In this manner the gas volume as a whole is considerably increased and as a result the coupling is particularly supple. This is the more easy seeing that, according to the invention, even relatively slight alteration in the volume of gas is sufficient to influence the elasticity of the coupling to a considerable extent. As a result, the dimensions of the coupling are not greater and its construction not much more complicated than in the case of the known constructions. Providing there are hollow spaces in the rigid coupling halves or feed passages leading to the coupling elements can be arranged therein, it is advisable to provide the connecting means for the compressed gas feed, not on the coupling elements themselves but on the rigid coupling parts.

Another possibility of altering the characteristic properties of the coupling can be attained by fitting valves with adjustable passages in the connecting conduits between the coupling elements and the auxiliary hollow spaces. By closing the passage of these valves or reducing it to a certain size the displacement of air from the hollow elements into the auxiliary spaces and inversely, can be varied within wide limits according to the loading of the driven and driving coupling halves. If, for example, the passages between the coupling elements taking up the rotary load and the hollow spaces are made very narrow, the coupling will be rigid or hard at first and become gradually softer or more supple, whereas in the case of sufficiently wide passages, the coupling will be first supple and gradually become harder.

An embodiment of the coupling according to the invention is illustrated by way of example in the accompanying drawing, in which Fig. 1 is a section taken along the axis of two shafts connected by a coupling according to the invention.

Fig. 2 shows the coupling in end view.

Fig. 3 is a cross-section of a coupling provided with gas passage connections.

Fig. 4 is a front elevation of the coupling shown in section in Fig. 3.

The shafts 1 and 2 coupled together each carry one of the coupling halves 3 and 4 which, in the example illustrated are identical in construction. These coupling halves are each keyed with the aid of a ring-shaped part 5, 6 on the ends of the shafts 1 and 2 respectively. Arms 7 and 8 extend radially outwards from the ring-shaped parts 5 and 6 respectively and project beyond the ends of the shafts 1 and 2, these arms being connected by hollow coupling elements 9 of elastic material, such as rubber. For the sake of clearness the hollow space enclosed in the coupling elements is only indicated in the case of one such element in Fig. 2. The coupling elements, which are open at their ends and provided with external flanges, are pressure tight firmly and connected on their outer surfaces with the aid of rings 12 engaging over the flanges and screwed on the arms 7 and 8. In the construction illustrated, the arms 7 and 8 are hollow and form chambers connected up with the hollow coupling elements by passages 10. Nipples 11, each equipped with a non-return valve, are provided on the coupling arms 7 and 8 as means for connecting up with a pressure gas conduit (not shown) and compressed air or some other gas can be introduced into the hollow spaces in the arms 7 and 8 and thence into the coupling elements by these nipples 11. A valve with adjustable passage can also be fitted in each of the passages connecting the hollow spaces of the coupling arms 7, 8 with the coupling elements 9.

As shown in Figs. 3 and 4 the ring-like passage 14 is positioned in front of the coupling and the ring-like passage 15 behind it and the auxiliary gas chambers indicated at 7 and 8.

I claim:

1. Elastic coupling for shafts and the like, comprising two coupling halves, each secured to the end of each of two shafts to be coupled, each coupling half provided with a plurality of hollow arms which form chambers and are distributed in star-shape around the axis of the shafts and alternating with the arms of its companion half, coupling elements of elastically yieldable and flexible fabric secured to the surfaces of each two arms of different coupling halves, said surfaces facing one another, said elements forming flat compressible hollow bodies inflatable in all directions having thin walls filled with gaseous medium, and means for adjusting the pressure of the gas medium.

2. Elastic coupling according to claim 1, wherein the fastening surfaces between the coupling bodies and the coupling arms are smaller than the largest predetermined cross-section of the coupling bodies in radial planes.

3. Elastic coupling according to claim 1, wherein the hollow bodies are connected with a nipple equipped with a non-return valve for joining up to a pressure gas feed.

4. Elastic coupling according to claim 1, wherein the coupling elements are connected in groups by gas passages.

5. Elastic coupling according to claim 1, further provided with a plurality of individual auxiliary gas chambers and wherein each coupling element is connected up with one of said auxiliary gas chambers.

6. Elastic coupling according to claim 1, further provided with at least one auxiliary gas chamber and wherein the coupling elements are connected up with said one auxiliary gas chamber.

7. Elastic coupling according to claim 6, wherein the chambers formed by said hollow arms of the coupling serve as auxiliary gas chambers.

References Cited in the file of this patent

UNITED STATES PATENTS 1,815,639    Wilkin et al. _____ July 21, 1931